United States Patent Office 2,969,414
Patented Jan. 24, 1961

2,969,414

MANUFACTURE OF CADMIUM AND NICKEL PLATES FOR BATTERIES OF THE NICKEL-CADMIUM TYPE

Arthur Fleischer, Livingston, N.J., assignor to the United States of America as represented by the Secretary of the Army No Drawing. Filed Sept. 30, 1958, Ser. No. 764,463

2 Claims. (Cl. 136—29)

This invention relates to the manufacture of cadmium and nickel plates for batteries of the nickel-cadmium type.

Nickel plates and cadmium plates for nickel-cadmium batteries are made in known manner by utilizing sintered nickel plaques of high porosity as the support for the active masses of the positive (nickel) and the negative (cadmium) plates. Porous, sintered nickel plaques are prepared in known manner by sintering carbonyl nickel powder of low apparent density to obtain plaques with porosities varying in the range from 60% to 90%. These porous nickel plaques serve as the support for the active nickel and cadmium masses of the positive and negative plates. The plates are made in well known manner by impregnation of the porous plaques with nickel or cadmium salt solutions whereupon the heavy metal ions are precipitated in the pores of the plaques by cathodic polarization in alkali hydroxide.

The introduction of the active masses into the pores of the plaques is usually accomplished by means of four steps carried out in sequence; namely, the soaking of the plaques in solutions of nickel or cadmium salts, preferably the nitrates, cathodic polarization of the soaked plates in alkali solution, washing of the plates, and drying. This cycle of operations may be repeated to introduce the desired amount of active mass into the pores of the plaques. Generally, plaques having a porosity of between 75% and 85% are subjected to four cycles of impregnation for both the positive and negative plates. By this procedure, the active mass, assuming that the compounds precipitated in the pores of the plaques are hydroxides, occupies between 30 to 40% of the pore volume. (For more detailed information on this four-step process see the article "Sintered Plates for Nickel-Cadmium Batteries," Journal of the Electrochemical Society, volume 94, No. 6, December, 1948.)

The washing step includes a wet-scrubbing operation either immediately after polarization or after the washing step itself which is to remove the soluble salts and hydroxides from the pores of the nickel plaque. The wet-scrubbing operation itself is to remove the active materials not held within the pores of the plaques but distributed in more or less irregular patches as a coating upon the surface of the plaques. The complete removal of these surface patches or films is very desirable particularly in thin plate batteries having thin plate separators. On the cadmium plate this surplus or excess material increases the thickness of the plate thus causing difficulties in the assembly of the cell elements into a cell container which is so dimensioned as to bring about a close fit of the cell elements. If the excess material is not removed from the plates, these plates have to be forced into the cell container which usually leads to breakage of the plates and various other damages. On the nickel plates the excess material tends to shed during operation thus muddying the electrolyte and causing many difficulties.

Since the conventional wet-scrubbing does not remove all of the surplus material from the plates it is customary to supplement the surface cleaning with a final scrubbing of the plates after plate formation using metal or nylon brushes, an operation which is usually done by hand and is therefore time consuming and costly.

I now have found that conventional wet-scrubbing operations may be replaced by treating the plates with an aqueous solution of ammonium hydroxide and ammonium nitrate for about 1 to 10 minutes. Instead of ammonium hydroxide other substituted ammonium hydroxides may be used such as methylamine, ethylamine, propylamine, tri-hydroxy ethylamine, quaternary ammonium compounds and similar ammoniacal reagents having the properties of ammonium hydroxide. Instead of ammonium nitrate other soluble ammonium salts such as ammonium chloride or ammonium acetate may be used.

The invention will become more apparent from the following example:

Porous sintered nickel plaques are impregnated in the conventional manner with cadmium nitrate for the negative plates and nickel nitrate for the positive plates and then submitted in well known manner to cathodic polarization in an aqueous electrolyte containing about 25% potassium hydroxide. This cathodic polarization is usually carried on at an initial temperature of about 100° C. for 20 minutes using currents of 15 amperes for the negative plates and 50 amperes for the positive plates. Now instead of submitting these plates after polarization to the customary wet-scrubbing or brushing operations, the plates are soaked according to the invention in a solution containing for instance 400 gms. ammonium nitrate, 327 cc. concentrated ammonium hydroxide and 400 cc. water. According to the size of the plates and the amount of excess material deposited on the surface of the plates soaking is continued for about 1 to 10 minutes or until practically all excess material is removed. The soaked plates are then washed for 8 hours in running water and dried at 80° C. The absence of surface coating in the treated plates is especially noticeable after drying. Instead of the "dip" treatment a spray treatment is preferable, spraying the above-mentioned solution of ammonium nitrate and ammonium hydroxide in water onto the plates using a conventional spray gun. The spray treatment enables a higher degree of control in the removing of the surplus hydroxides from the plates.

Instead of the above-mentioned ammonium hydroxide other ammoniacal solutions in equivalent quantities such as the above-mentioned amines or quaternary ammonium compounds may be used. The solvent treatment need not be applied after each cycle of soaking and polarization.

The present invention greatly simplifies the manufacturing process of electrodes for nickel-cadmium batteries and provides a possibility of setting up a continuous process in the manufacture of such plates. An additional advantage of the present invention is an improvement in high rate performance over the plates treated with wet-scrubbing but this additional advantage shows up mainly in the case of the negative plates.

It will be obvious to those skilled in the art that various changes may be resorted to in the process of the present invention without departing from the broad inventive idea defined in the following claims.

What is claimed is:

1. A method of manufacturing electrode plates from sintered, porous, nickel plaques carrying the electrodic materials of nickel cadmium batteries comprising impregnating said plaques with a solution of the salts of said electrodic materials, cathode polarization of said materials in alkaline solution, and washing and drying the plates characterized in that the washing operation is preceded by a soaking of the plates from 1 to 10 minutes, in an aqueous solution containing (1) an ammoniacal reagent selected from the group consisting of ammonium hydroxide, substituted ammonium hydroxides, methylamine, ethylamine, propylamine, trihydroxy ethylamine and quaternary ammonium compounds and (2) a soluble ammonium salt selected from the group consisting of ammonium nitrate, ammonium chloride and ammonium acetate for the purpose of removing the excess of said active electrodic materials from the surfaces of the finished plates.

2. Method of removing the excess active materials from the surface of the plates of nickel cadmium batteries according to claim 1 in which said aqueous solution consists of about 400 gms. of ammonium nitrate, about 330 cc. of concentrated ammonium hydroxide, and 400 cc. of water.

References Cited in the file of this patent

UNITED STATES PATENTS

| | | |
|---|---|---|
| 681,329 | Kuettner | Aug. 27, 1901 |
| 1,096,751 | Porscke et al. | May 12, 1914 |
| 1,988,861 | Thorausch et al. | Jan. 22, 1935 |

FOREIGN PATENTS

| | | |
|---|---|---|
| 199,020 | Great Britain | Nov. 22, 1923 |

OTHER REFERENCES

Abstract 224,440, 657 O.G. 1588, Apr. 29, 1952.